(12) United States Patent
Lin et al.

(10) Patent No.: US 12,650,955 B2
(45) Date of Patent: Jun. 9, 2026

(54) SYSTEM AND METHOD FOR EDITING A FILE-BACKED DATABASE TABLE

(71) Applicant: Kinaxis Inc., Ottawa (CA)

(72) Inventors: Angela Lin, Ottawa (CA); Jim Crozman, Ottawa (CA)

(73) Assignee: Kinaxis Inc., Ottawa (CA)

( * ) Notice: Subject to any disclaimer, the term of this patent is extended or adjusted under 35 U.S.C. 154(b) by 0 days.

(21) Appl. No.: 18/667,187

(22) Filed: May 17, 2024

(65) Prior Publication Data

US 2024/0394226 A1 Nov. 28, 2024

Related U.S. Application Data

(60) Provisional application No. 63/504,480, filed on May 26, 2023.

(51) Int. Cl.
*G06F 16/176* (2019.01)
*G06F 16/16* (2019.01)
*G06F 16/22* (2019.01)

(52) U.S. Cl.
CPC ........ *G06F 16/1767* (2019.01); *G06F 16/162* (2019.01); *G06F 16/2282* (2019.01)

(58) Field of Classification Search
CPC .................................................. G06F 16/1767
USPC ......................................................... 707/703
See application file for complete search history.

(56) References Cited

U.S. PATENT DOCUMENTS

| | | | |
|---|---|---|---|
| 5,943,676 A | 8/1999 | Boothby | |
| 6,212,529 B1 | 4/2001 | Boothby et al. | |
| 6,405,218 B1 | 6/2002 | Boothby | |
| 6,553,391 B1 | 4/2003 | Goldring et al. | |
| 6,799,190 B1 | 9/2004 | Boothby | |
| 7,209,911 B2 | 4/2007 | Boothby et al. | |
| 7,302,446 B1 | 11/2007 | Boothby | |
| 7,478,386 B2 | 1/2009 | Dietrich et al. | |
| 2003/0158863 A1* | 8/2003 | Haskin | G06F 11/1435 |
| 2016/0246687 A1* | 8/2016 | Stark | G06F 11/1435 |
| 2017/0315877 A1* | 11/2017 | Kaplingat | G06F 11/1458 |
| 2019/0087285 A1* | 3/2019 | Kumar | G06F 16/182 |
| 2019/0163800 A1 | 5/2019 | Mehler et al. | |
| 2022/0058281 A1* | 2/2022 | Gryting | G06F 3/065 |

* cited by examiner

*Primary Examiner* — Muluemebet Gurmu
(74) *Attorney, Agent, or Firm* — Ruggiero McAllister & McMahon LLC

(57) ABSTRACT

Systems and methods for editing a file-backed table in a database having a concurrency control mechanism, that include reading the content of the file-backed table, and modifying the content of the file-backed table.

15 Claims, 9 Drawing Sheets

700

START 702

WRITE NEW DATA FILE(S) THAT CONTAIN MODIFIED CONTENTS OF THE FILE-BACKED TABLE 704

USING CONCURRENCY CONTROL MECHANISM OF THE DATABASE, UPDATE THE METADATA TABLE 706

END 708

SYSTEM AND METHOD FOR EDITING A FILE-BACKED DATABASE TABLE

This application claims priority from U.S. Provisional Application No. 63/704,480 filed May 26, 2023, the disclosure of which is hereby incorporated by reference in its entirety.

BACKGROUND

It is difficult to enable the contents of a file-backed table to be transactionally edited within a database having a concurrency control mechanism. There is a need to enable inserts, updates, and deletes on the file-backed table. There is an additional constraint by the requirement that the files be write-once only. They cannot be modified in-place.

BRIEF SUMMARY

The systems and methods disclosed herein implement a file-backed table as a logical view of a set of files on disk. The files on disk can be connected with metadata, which may define the contents of the logical view. The metadata can be stored in data tables of a platform having a concurrency control mechanism. Since the metadata is part of the platform database, the visibility of versions of the metadata is controlled by the platform's concurrency control mechanism. The visibility of the files on disk is, in turn, controlled by the visibility of their corresponding metadata.

An edit operation can then be implemented on a file-backed table by creating new files on disk and updating the metadata using a database transaction in the platform. The systems and methods disclosed herein can be applied to any file format for table data. Furthermore, the systems and methods disclosed herein can be applied to any database concurrency control technique.

In one aspect, a computing apparatus is provided, that includes a processor. The computing apparatus also includes a memory storing instructions that, when executed by the processor, configure the apparatus to: read, by the processor, content of a file-backed table in a database having a concurrency control mechanism; and modify, by the processor, the content of the file-backed table.

When reading the content of the file-backed table, the instructions may further configure the apparatus to: scan, by the processor, a metadata table that contains metadata for the file-backed table; determine, by the processor, one or more metadata records that are visible by using the concurrency control mechanism of the database; and return, by the processor, content of one or more data files that correspond to the one or more metadata records that are visible.

When modifying the content of the file-backed table, the instructions may further configure the apparatus to: write, by the processor, one or more new data files that contain modified content of the file-backed table; and update, by the processor, a metadata table that contains metadata for the file-backed table, by using the concurrency control mechanism of the database.

The modified content of the file-backed table can be at least one of: insertion of one or more records; deletion of one or more records; and update one or more existing records.

Where the modified content is the insertion of one or more records, the instructions can further configure the apparatus to: write, by the processor, the one or more new data files that contain the one or more inserted records; and insert, by the processor, one or more new metadata records into the metadata table, the one or more new metadata records referencing the one or more new data files.

Where the modified content is the deletion of one or more records, the instructions can further configure the apparatus to: locate, by the processor, one or more data files that contain the one or more records to be deleted; make, by the processor, a new copy of each of the one or more data files, each new copy omitting the one or more records that are to be deleted; locate, by the processor, one or more metadata records that correspond to the new copy of each of the one or more data files; and update, by the processor, a data file locator in each of the one or more metadata records to point to the new copy of each of the one or more data files. Where the new copy of each of the one or more data files is empty, the instructions can further configure the apparatus to: delete, by the processor, the one or more metadata records that correspond to the new copy of each of the one or more data files.

Where the modified content is updating the one or more existing records, the instructions can further configure the apparatus to: locate, by the processor, one or more data files that contain the one or more existing records to be updated; make, by the processor, a new copy of each of the one or more data files, each new copy including the one or more existing records to be updated; locate, by the processor, one or more metadata records that correspond to the new copy of each of the one or more data files; and update, by the processor, a data file locator in each of the one or more metadata records to point to the new copy of each of the one or more data files. Other technical features may be readily apparent to one skilled in the art from the following figures, descriptions, and claims.

In one aspect, a non-transitory computer-readable storage medium is provided, the computer-readable storage medium including instructions that when executed by a computer, cause the computer to: read, by a processor, content of a file-backed table in a database having a concurrency control mechanism; and modify, by the processor, the content of the file-backed table.

When reading the content of the file-backed table, the instructions may further cause the computer to: scan, by the processor, a metadata table that contains metadata for the file-backed table; determine, by the processor, one or more metadata records that are visible by using the concurrency control mechanism of the database; and return, by the processor, content of one or more data files that correspond to the one or more metadata records that are visible.

When modifying the content of the file-backed table, the instructions may further cause the computer to: write, by the processor, one or more new data files that contain modified content of the file-backed table; and update, by the processor, a metadata table that contains metadata for the file-backed table, by using the concurrency control mechanism of the database.

The modified content of the file-backed table can be at least one of: insertion of one or more records; deletion of one or more records; and update one or more existing records.

Where the modified content is the insertion of one or more records, the instructions can further configure the computer to: write, by the processor, the one or more new data files that contain the one or more inserted records; and insert, by the processor, one or more new metadata records into the metadata table, the one or more new metadata records referencing the one or more new data files.

Where the modified content is the deletion of one or more records, the instructions can further configure the computer to: locate, by the processor, one or more data files that contain the one or more records to be deleted; make, by the processor, a new copy of each of the one or more data files, each new copy omitting the one or more records that are to be deleted; locate, by the processor, one or more metadata records that correspond to the new copy of each of the one or more data files; and update, by the processor, a data file locator in each of the one or more metadata records to point to the new copy of each of the one or more data files. Where the new copy of each of the one or more data files is empty, the instructions can further configure the computer to: delete, by the processor, the one or more metadata records that correspond to the new copy of each of the one or more data files.

Where the modified content is updating the one or more existing records, the instructions can further configure the computer to locate, by the processor, one or more data files that contain the one or more existing records to be updated; make, by the processor, a new copy of each of the one or more data files, each new copy including the one or more existing records to be updated; locate, by the processor, one or more metadata records that correspond to the new copy of each of the one or more data files; and update, by the processor, a data file locator in each of the one or more metadata records to point to the new copy of each of the one or more data files. Other technical features may be readily apparent to one skilled in the art from the following figures, descriptions, and claims.

In one aspect, a computer-implemented method for editing a file-backed table in a database having a concurrency control mechanism, is provided. The method includes: reading, by a processor, content of the file-backed table; and modifying, by the processor, the content of the file-backed table.

When reading the content of the file-backed table, the computer-implemented method may also include: scanning, by the processor, a metadata table that contains metadata for the file-backed table; determining, by the processor, one or more metadata records that are visible by using the concurrency control mechanism of the database; and returning, by the processor, content of one or more data files that correspond to the one or more metadata records that are visible.

When modifying the content of the file-backed table, the computer-implemented method may also include: writing, by the processor, one or more new data files that contain modified content of the file-backed table; and updating, by the processor, a metadata table that contains metadata for the file-backed table, by using the concurrency control mechanism of the database.

The modified content of the file-backed table can be at least one of: insertion of one or more records; deletion of one or more records; and updating one or more existing records.

Where the modified content is the insertion of one or more records, the method can also include: writing, by the processor, the one or more new data files that contain the one or more inserted records; and inserting, by the processor, one or more new metadata records into the metadata table, the one or more new metadata records referencing the one or more new data files.

Where the modified content is the deletion of one or more records, the method can further include: locating, by the processor, one or more data files that contain the one or more records to be deleted; making, by the processor, a new copy of each of the one or more data files, each new copy omitting the one or more records that are to be deleted; locating, by the processor, one or more metadata records that correspond to the new copy of each of the one or more data files; and updating, by the processor, a data file locator in each of the one or more metadata records to point to the new copy of each of the one or more data files. Where the new copy of each of the one or more data files is empty, the method can further include deleting, by the processor, the one or more metadata records that correspond to the new copy of each of the one or more data files.

Where the modified content is updating the one or more existing records, the method can further include: locating, by the processor, one or more data files that contain the one or more existing records to be updated; making, by the processor, a new copy of each of the one or more data files, each new copy including the one or more existing records to be updated; locating, by the processor, one or more metadata records that correspond to the new copy of each of the one or more data files; and updating, by the processor, a data file locator in each of the one or more metadata records to point to the new copy of each of the one or more data files. Other technical features may be readily apparent to one skilled in the art from the following figures, descriptions, and claims.

The details of one or more embodiments of the subject matter of this specification are set forth in the accompanying drawings and the description below. Other features, aspects, and advantages of the subject matter may become apparent from the description, the drawings, and the claims.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
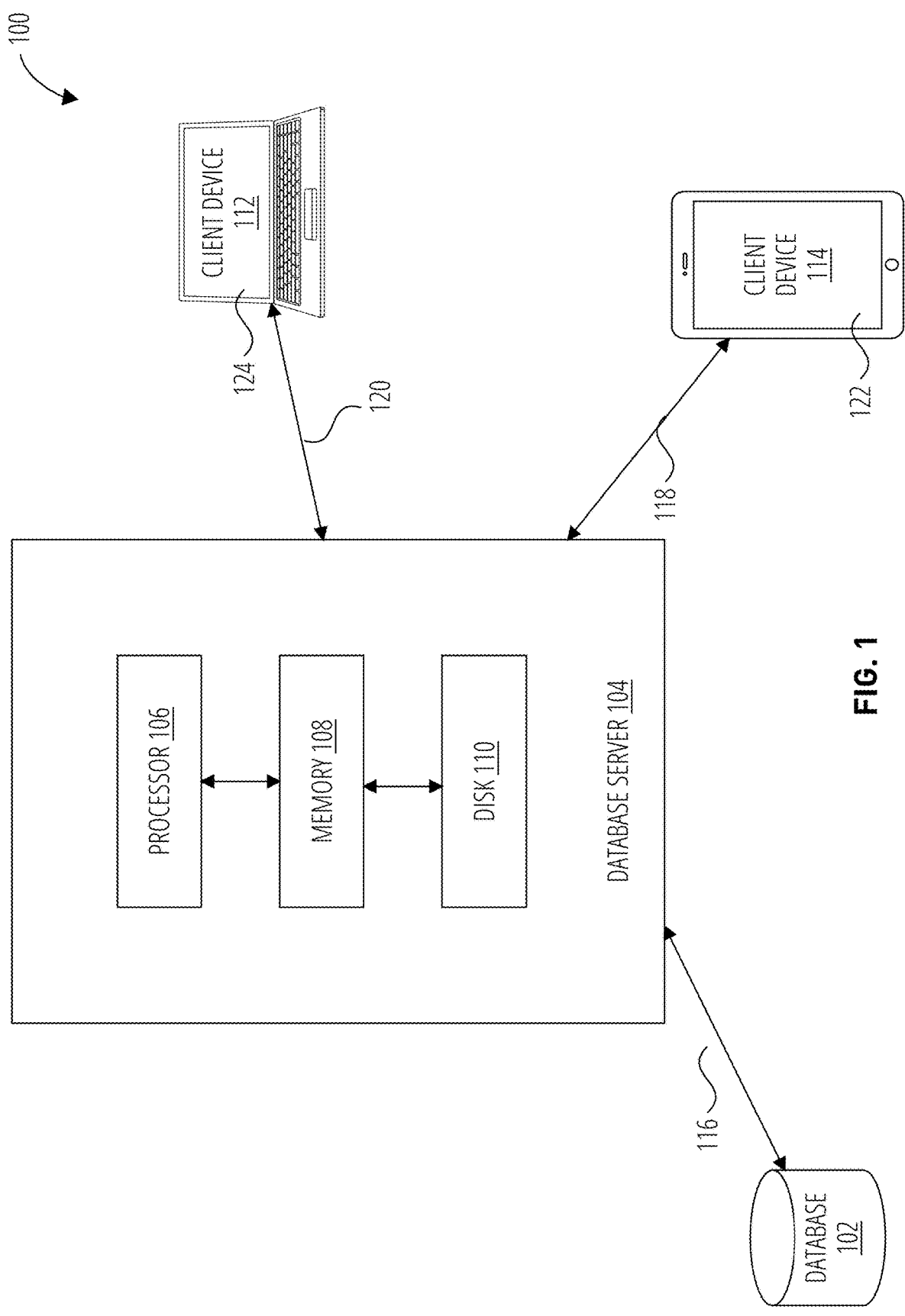
FIG. 1 illustrates an example of a system for editing a file-backed database table in accordance with one embodiment.

Aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable storage media having computer readable program code embodied thereon.

Many of the functional units described in this specification have been labeled as modules, in order to emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable storage media.

Any combination of one or more computer readable storage media may be utilized. A computer readable storage medium may be, for example, but not limited to, an electronic, magnetic, optical, electromagnetic, infrared, or semiconductor system, apparatus, or device, or any suitable combination of the foregoing.

More specific examples (a non-exhaustive list) of the computer readable storage medium can include the following: a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), a Blu-ray disc, an optical storage device, a magnetic tape, a Bernoulli drive, a magnetic disk, a magnetic storage device, a punch card, integrated circuits, other digital processing apparatus memory devices, or any suitable combination of the foregoing, but would not include propagating signals. In the context of this document, a computer readable storage medium may be any tangible medium that can contain, or store a program for use by or in connection with an instruction execution system, apparatus, or device.

Computer program code for carrying out operations for aspects of the present disclosure may be written in any combination of one or more programming languages, including an object oriented programming language such as Java, Python, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of the disclosure may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the disclosure. However, the disclosure may be practiced without one or more of the specific details, or with other methods, components, materials, and so forth. In other instances, well-known structures, materials, or operations are not shown or described in detail to avoid obscuring aspects of the disclosure.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function/act specified in the schematic flowchart diagrams and/or schematic block diagrams block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present disclosure. In this regard, each block in the schematic flowchart diagrams and/or schematic block diagrams may represent a module, segment, or portion of code, which comprises one or more executable instructions for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer instructions.

The description of elements in each figure may refer to elements of proceeding figures. Like numbers refer to like elements in all figures, including alternate embodiments of like elements.

A computer program (which may also be referred to or described as a software application, code, a program, a script, software, a module or a software module) can be written in any form of programming language. This includes compiled or interpreted languages, or declarative or procedural languages. A computer program can be deployed in many forms, including as a module, a subroutine, a stand-alone program, a component, or other unit suitable for use in a computing environment. A computer program can be deployed to be executed on one computer or can be deployed on multiple computers that are located at one site or distributed across multiple sites and interconnected by a communication network.

As used herein, a "software engine" or an "engine," refers to a software implemented system that provides an output that is different from the input. An engine can be an encoded block of functionality, such as a platform, a library, an object or a software development kit ("SDK"). Each engine can be implemented on any type of computing device that includes one or more processors and computer readable media. Furthermore, two or more of the engines may be implemented on the same computing device, or on different computing devices. Non-limiting examples of a computing device include tablet computers, servers, laptop or desktop computers, music players, mobile phones, e-book readers, notebook computers, PDAs, smart phones, or other stationary or portable devices.

The processes and logic flows described herein can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit). For example, the processes and logic flows that can be performed by an apparatus, can also be implemented as a graphics processing unit (GPU).

Computers suitable for the execution of a computer program include, by way of example, general or special purpose microprocessors or both, or any other kind of central processing unit. Generally, a central processing unit receives instructions and data from a read-only memory or a random access memory or both. A computer can also include, or be operatively coupled to receive data from, or transfer data to, or both, one or more mass storage devices for storing data, e.g., optical disks, magnetic, or magneto optical disks. It should be noted that a computer does not require these devices. Furthermore, a computer can be embedded in another device. Non-limiting examples of the latter include a game console, a mobile telephone a mobile audio player, a personal digital assistant (PDA), a video player, a Global Positioning System (GPS) receiver, or a portable storage device. A non-limiting example of a storage device include a universal serial bus (USB) flash drive.

Computer readable media suitable for storing computer program instructions and data include all forms of non-volatile memory, media and memory devices; non-limiting examples include magneto optical disks; semiconductor memory devices (e.g., EPROM, EEPROM, and flash memory devices); CD ROM disks; magnetic disks (e.g., internal hard disks or removable disks); and DVD-ROM disks. The processor and the memory can be supplemented by, or incorporated in, special purpose logic circuitry.

To provide for interaction with a user, embodiments of the subject matter described herein can be implemented on a computer having a display device for displaying information to the user and input devices by which the user can provide input to the computer (for example, a keyboard, a pointing device such as a mouse or a trackball, etc.). Other kinds of devices can be used to provide for interaction with a user. Feedback provided to the user can include sensory feedback (e.g., visual feedback, auditory feedback, or tactile feedback). Input from the user can be received in any form, including acoustic, speech, or tactile input. Furthermore, there can be interaction between a user and a computer by way of exchange of documents between the computer and a device used by the user. As an example, a computer can send web pages to a web browser on a user's client device in response to requests received from the web browser.

Embodiments of the subject matter described in this specification can be implemented in a computing system that includes: a front end component (e.g., a client computer having a graphical user interface or a Web browser through which a user can interact with an implementation of the subject matter described herein); or a middleware component (e.g., an application server); or a back end component (e.g. a data server); or any combination of one or more such back end, middleware, or front end components. The components of the system can be interconnected by any form or medium of digital data communication, e.g., a communication network. Non-limiting examples of communication networks include a local area network ("LAN") and a wide area network ("WAN").

The computing system can include clients and servers. A client and server are generally remote from each other and typically interact through a communication network. The relationship of client and server arises by virtue of computer programs running on the respective computers and having a client-server relationship to each other.

FIG. 1 illustrates an example of a system 100 for editing a file-backed database table.

System 100 includes a database server 104, a database 102, and client devices 112 and 114. Database server 104 can include a memory 108, a disk 110, and one or more processors 106. In some embodiments, memory 108 can be volatile memory, compared with disk 110 which can be non-volatile memory. In some embodiments, database server 104 can communicate with database 102 using interface 116. Database 102 can be a versioned database or a database that does not support versioning. While database 102 is illustrated as separate from database server 104, database 102 can also be integrated into database server 104, either as a separate component within database server 104, or as part of at least one of memory 108 and disk 110. A versioned database can refer to a database which provides numerous complete delta-based copies of an entire database. Each complete database copy represents a version. Versioned databases can be used for numerous purposes, including simulation and collaborative decision-making.

System 100 can also include additional features and/or functionality. For example, system 100 can also include additional storage (removable and/or non-removable) including, but not limited to, magnetic or optical disks or tape. Such additional storage is illustrated in FIG. 1 by memory 108 and disk 110. Storage media can include volatile and nonvolatile, removable and non-removable media implemented in any method or technology for storage of information such as computer-readable instructions, data structures, program modules or other data. Memory 108 and disk 110 are examples of non-transitory computer-readable storage media. Non-transitory computer-readable media also includes, but is not limited to, Random Access Memory (RAM), Read-Only Memory (ROM), Electrically Erasable Programmable Read-Only Memory (EEPROM), flash memory and/or other memory technology, Compact Disc Read-Only Memory (CD-ROM), digital versatile discs (DVD), and/or other optical storage, magnetic cassettes, magnetic tape, magnetic disk storage or other magnetic storage devices, and/or any other medium which can be used to store the desired information and which can be accessed by system 100. Any such non-transitory computer-readable storage media can be part of system 100.

System 100 can also include interfaces 116, 118 and 120. Interfaces 116, 118 and 120 can allow components of system 100 to communicate with each other and with other devices. For example, database server 104 can communicate with database 102 using interface 116. Database server 104 can also communicate with client devices 112 and 114 via interfaces 120 and 118, respectively. Client devices 112 and 114 can be different types of client devices; for example, client device 112 can be a desktop or laptop, whereas client device 114 can be a mobile device such as a smartphone or tablet with a smaller display. Non-limiting example interfaces 116, 118 and 120 can include wired communication links such as a wired network or direct-wired connection, and wireless communication links such as cellular, radio frequency (RF), infrared and/or other wireless communication links. Interfaces 116, 118 and 120 can allow database server 104 to communicate with client devices 112 and 114 over various network types. Non-limiting example network types can include Fibre Channel, small computer system interface (SCSI), Bluetooth, Ethernet, Wi-fi, Infrared Data Association (IrDA), Local area networks (LAN), Wireless Local area networks (WLAN), wide area networks (WAN) such as the Internet, serial, and universal serial bus (USB). The various network types to which interfaces 116, 118 and 120 can connect can run a plurality of network protocols including, but not limited to Transmission Control Protocol (TCP), Internet Protocol (IP), real-time transport protocol (RTP), realtime transport control protocol (RTCP), file transfer protocol (FTP), and hypertext transfer protocol (HTTP).

Using interface 116, database server 104 can retrieve data from database 102. The retrieved data can be saved in disk 110 or memory 108. In some cases, database server 104 can also comprise a web server, and can format resources into a format suitable to be displayed on a web browser. Database server 104 can then send requested data to client devices 112 and 114 via interfaces 120 and 118, respectively, to be displayed on applications 122 and 124. Applications 122 and 124 can be a web browser or other application running on client devices 112 and 114.

Systems disclosed herein for editing a file-backed database table can comprise the following components:

A file-backed table, defined as a table whose data contents are determined by a logical view of a set of files on disk;

A data file, defined as a file containing part of the contents of a file-backed table. A data file may be a single file, or a directory (which is a special kind of file) that contains one or more files;

A metadata table, defined as a database table that contains the metadata for the file-backed table;

A database table, defined as a table in the database that may be implemented by some other pre-existing mechanism, other than the file-backed table developed for this system;

A metadata record, defined as a record in the metadata table. The record contains a data file locator;

A data file locator, defined as a value that indicates the location of the data file that corresponds to this metadata record. An exemplary embodiment includes a filesystem path (e.g. c: \data\part1.dat), or a Uniform Resource Locator (URL).

Figure 2:
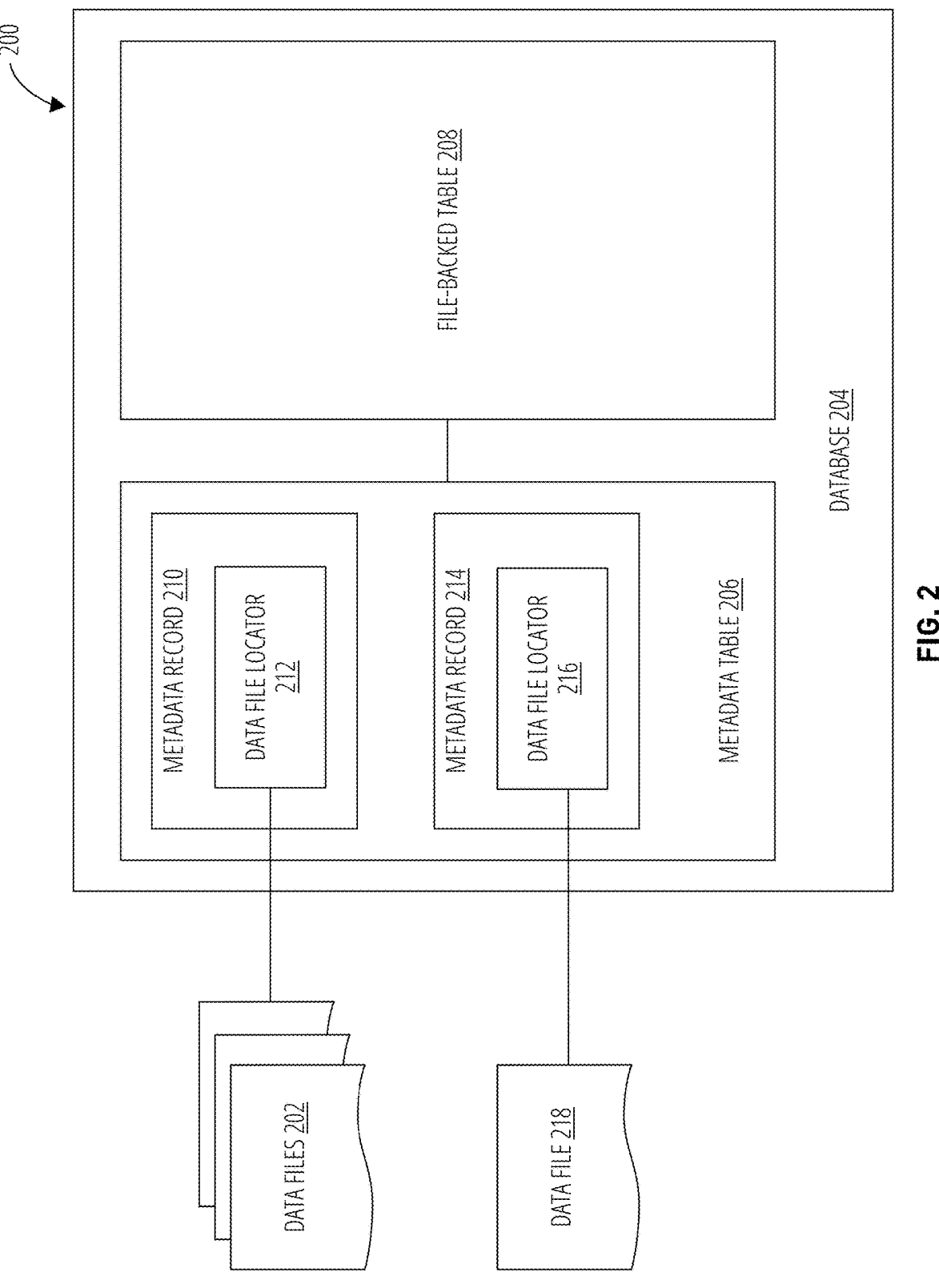
FIG. 2 illustrates a system architecture in accordance with one embodiment.

FIG. 2 illustrates a system architecture 200 of components in accordance with one embodiment. Database 204 comprises file-backed table 208 and metadata table 206. The metadata table 206 is a database table that contains the metadata for file-backed table 208. Metadata table 206 comprises one or more metadata records; in FIG. 2, metadata table 206 comprises metadata record 210 and metadata record 214. Each metadata table comprises a data file locator: metadata record 210 includes data file locator 212, while metadata record 214 includes data file locator 216. A data file locator indicates the location of the data file that corresponds to a corresponding metadata record. In FIG. 2, data file locator 216 indicates the location of data file 218, while data file locator 212 indicates the location of data files 202.

Data file 218 is a single file containing part of the contents of file-backed table 208. Data files 202, is a directory (which is a special kind of file) that contains one or more files.

Figure 3:
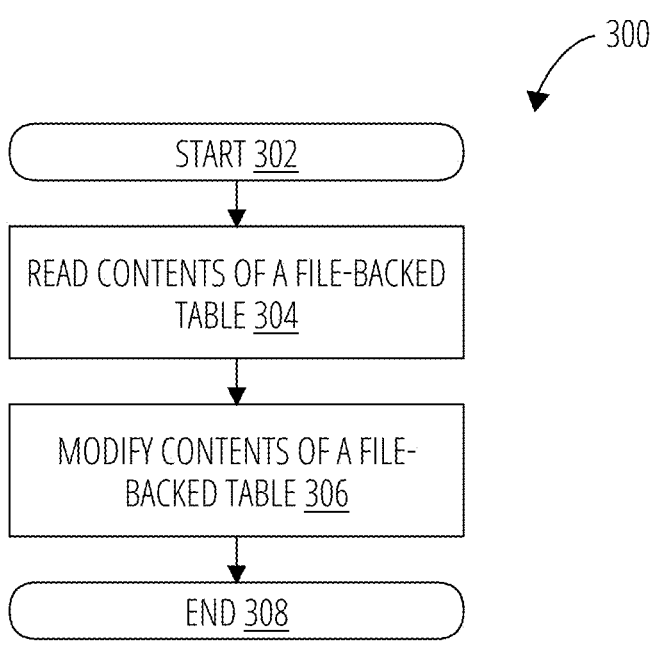
FIG. 3 illustrates a block diagram in accordance with one embodiment.

FIG. 3 illustrates a block diagram 300 in accordance with one embodiment of editing a file-backed database table. Two processes can be involved once the overall process starts at 302. First, at block 304, contents of a file-backed table are read. Next, at block 306, the contents of a file-backed are modified, after which the overall process ends at 308. Each of these is further elaborated below in FIG. 6-FIG. 9.

Figure 4:
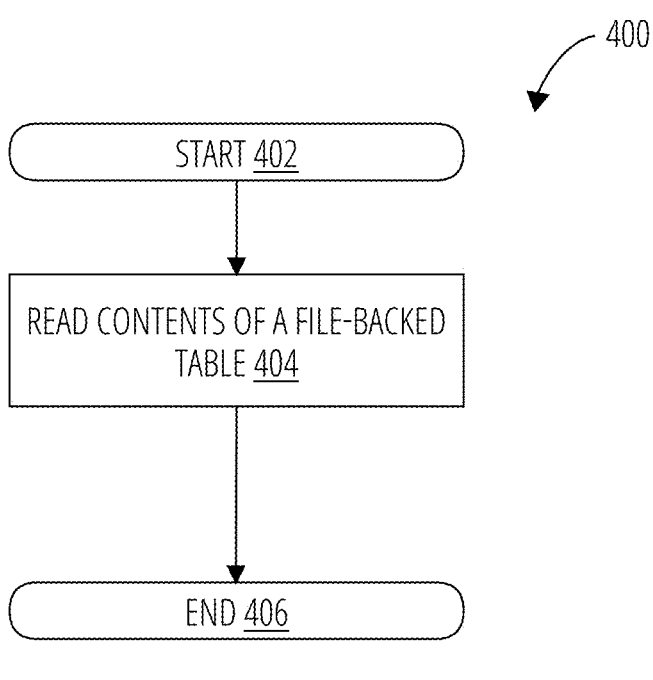
FIG. 4 illustrates a block diagram in accordance with one embodiment.

FIG. 4 illustrates a block diagram 400 in accordance with one embodiment of editing a file-backed database table. FIG. 4 is a variation of FIG. 3, in that once the overall process starts at 402, contents of a file-backed table can be read at block 404, without being modified. The overall process ends at 406. Block 404 is further elaborated in FIG. 6 below.

Figure 5:
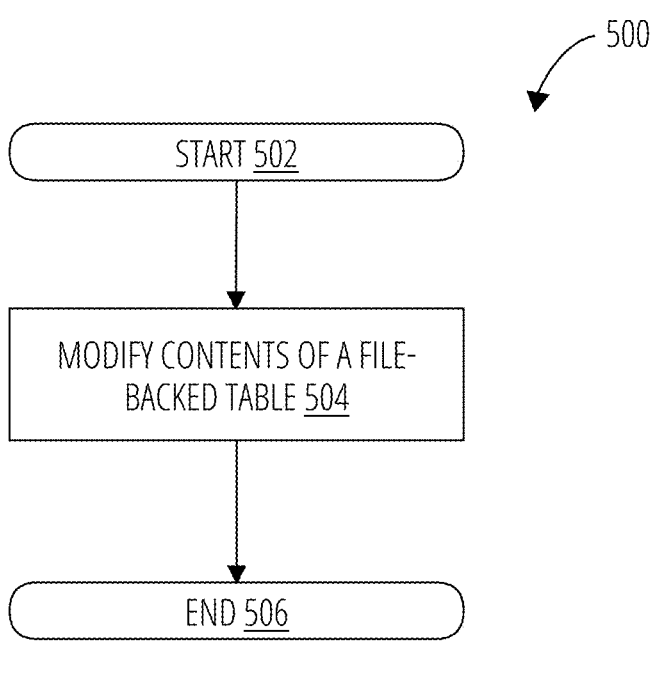
FIG. 5 illustrates a block diagram in accordance with one embodiment.

FIG. 5 illustrates a block diagram 500 in accordance with one embodiment of editing a file-backed database table. FIG. 5 is a variation of FIG. 3, in that once the overall process starts at 502, contents of a file-backed table can be modified at block 504, without being read. The overall process ends at 506. Block 504 is further elaborated in FIG. 7-FIG. 9 below.

Figure 6:
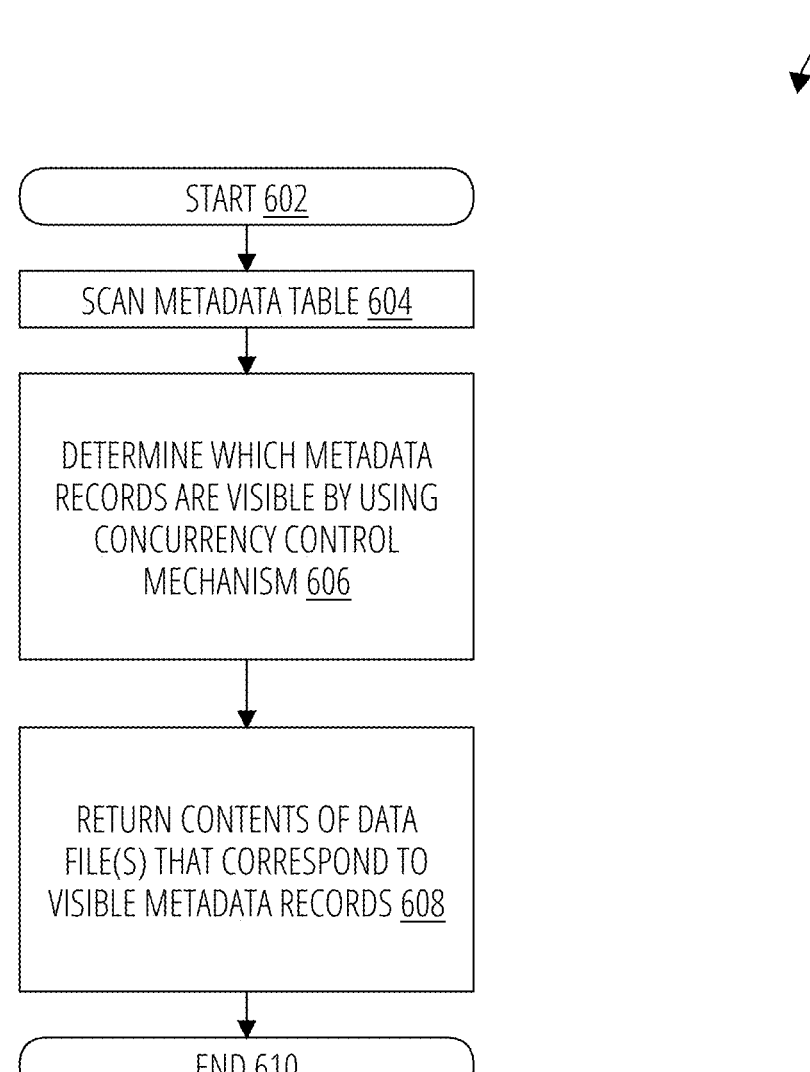
FIG. 6 illustrates a block diagram in relation to FIG. 3 and FIG. 4, in accordance with one embodiment.

FIG. 6 illustrates a block diagram 600 in relation to FIG. 3 and FIG. 4, in accordance with one embodiment. In FIG. 6, a subroutine of block 304 (in FIG. 3) or block 404 (in FIG. 4) is further elaborated, beginning at 602, in which contents of a file-backed table are read. The metadata table is scanned at block 604. Next, using the database's concurrency control mechanism, visible metadata records are determined at block 606. The contents of the data file(s) that correspond to the visible metadata records are then returned at 608. The subroutine ends at 610.

Figure 7:
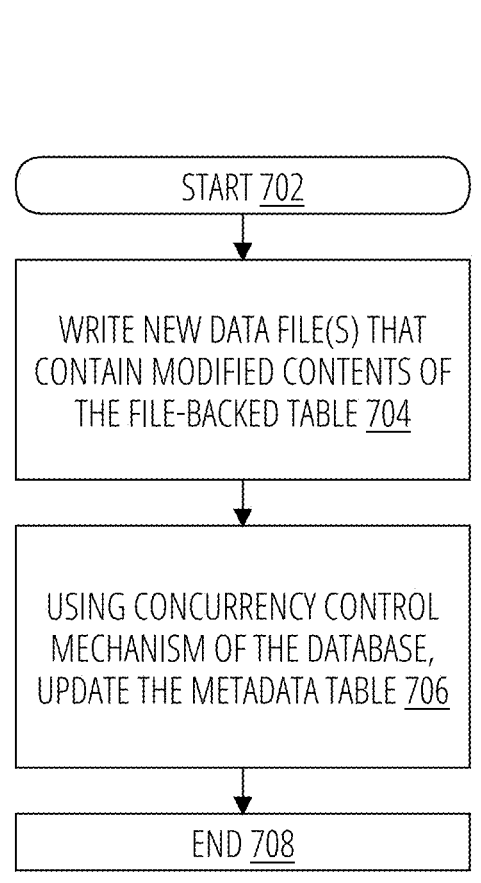
FIG. 7 illustrates a block diagram in relation to FIG. 3 and FIG. 5, in accordance with one embodiment.

FIG. 7 illustrates a block diagram 700 in relation to FIG. 3 and FIG. 5, in accordance with one embodiment. In FIG. 7, a subroutine of block 306 (in FIG. 3) or block 504 (in FIG. 5) is further elaborated, beginning at 702, in which contents of a file-backed table are modified. New data file(s) that contain the modified contents of the file-backed table are written at block 704 (which is further elaborated in FIG. 8). Next, using the database's concurrency control mechanism, the metadata table is updated at block 706 (which further elaborated in FIG. 9). The subroutine ends at 708.

Figure 8:
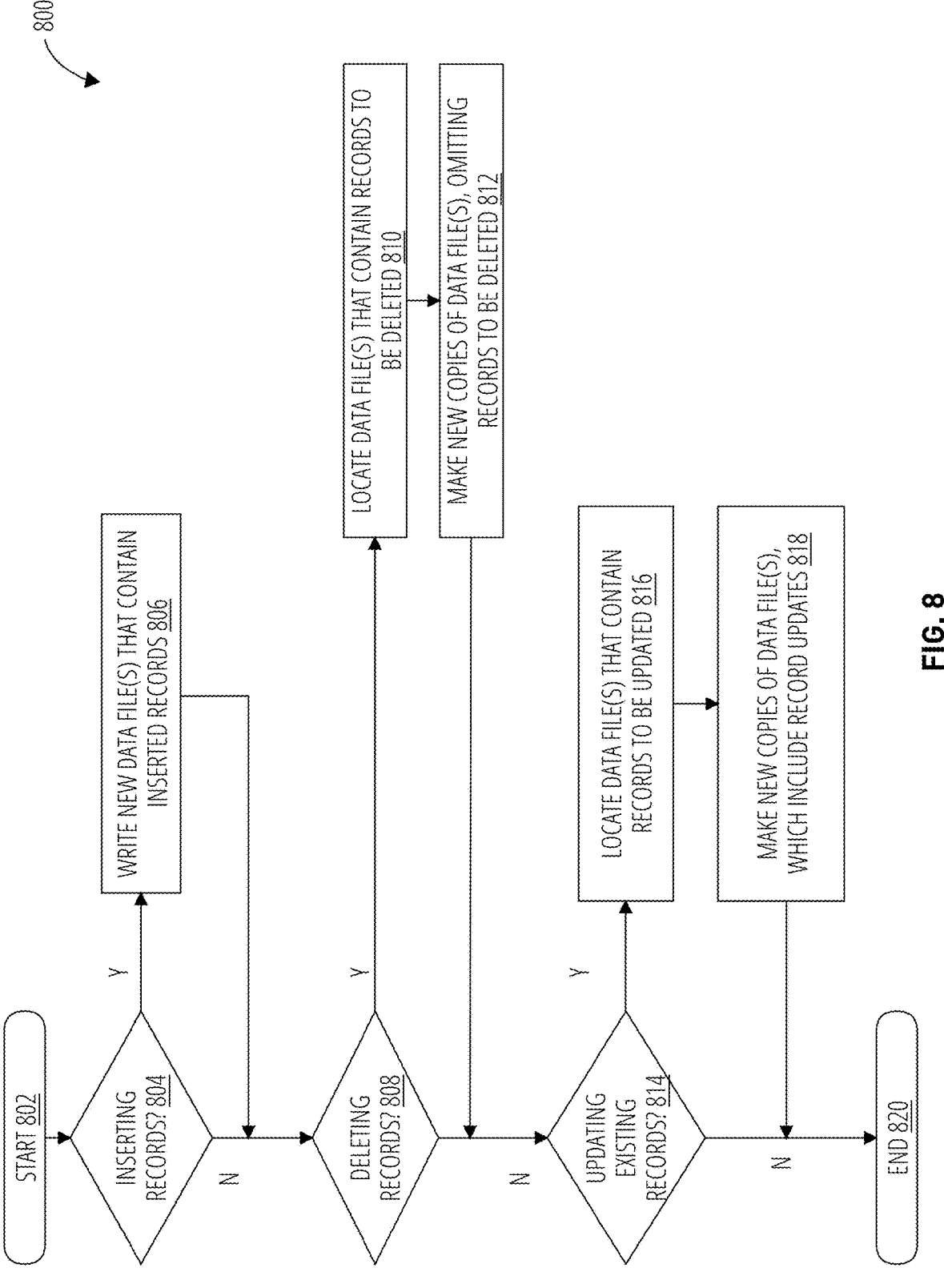
FIG. 8 illustrates a block diagram in relation to FIG. 7, in accordance with one embodiment.

FIG. 8 illustrates a block diagram 600 in relation to FIG. 7, in accordance with one embodiment. In FIG. 8, a subroutine of block 704 (in FIG. 7) is further elaborated, beginning at 802, in which new data file(s) that contain the modified contents of the file-backed table are written. The mechanism for writing new data file(s) depends on how one or more records are being modified.

Where one or more records are being inserted ('yes' at decision block 804), new data file(s) that contain the inserted records are written at block 806.

Where one or more records are being deleted ('yes' at decision block 808), a two-step process is involved. First, at block 810, the data file(s) that contain the records to be deleted are located. Next, at block 812, copies of these data file(s) are made, such that the records to be deleted, are omitted.

Where one or more existing records are being updated ('yes' at decision block 814), a two-step process is involved. First, at block 816, the data file(s) that contain the records to be updated are located. Next, at block 818, copies of these data file(s) are made, which include the record updates. The subroutine ends at 820.

Figure 9:
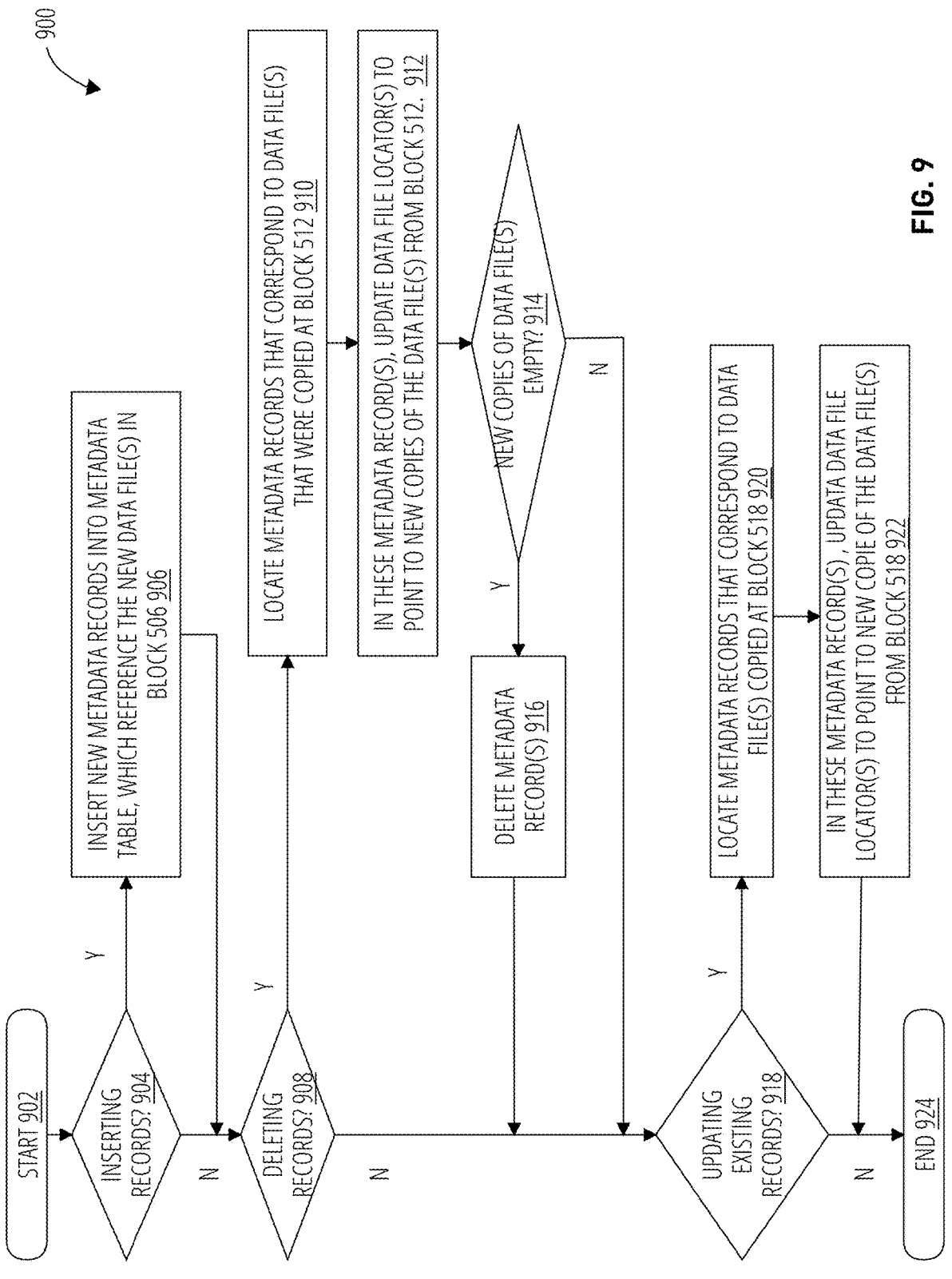
FIG. 9 illustrates a block diagram in relation to FIG. 7 and FIG. 8, in accordance with one embodiment.

FIG. 9 illustrates a block diagram 700 in relation to FIG. 7 and FIG. 8, in accordance with one embodiment. In FIG. 9, beginning at 702, a subroutine of block 706 (in FIG. 7) is further elaborated, in which a metadata table is updated. As in FIG. 6, the mechanism for updating the metadata table depends on how one or more records are being modified.

Where one or more records are being inserted ('yes' at decision block 904), new metadata records are inserted into the metadata table, which reference the new data file(s) created at block 806 in FIG. 8.

Where one or more records are being deleted ('yes' at decision block 908), a three-step process is involved. First, at block 910, the metadata records that correspond to the data files(s) that were copied at block 812 (in FIG. 8), are located. Next, at block 910, in these metadata record(s), the data file locator(s) are updated to point to the new copies of the data file(s) from block 812 (in FIG. 8). If the new copies of the data file(s) are empty ('yes' at decision block 914), the metadata record(s) are deleted instead, at block 916.

Where one or more existing records are being updated ('yes' at decision block 918), a two-step process is involved. First, at block 920, the metadata records that correspond to the data files(s) that were copied at block 818 (in FIG. 8), are located. Next, at block 922, in these metadata record(s), the data file locator(s) are updated to point to the new copies of the data file(s) from block 818 (in FIG. 8). The subroutine ends at 924.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

The invention claimed is:

1. A computing apparatus comprising:
a processor; and
a memory storing instructions that, when executed by the processor, configure the apparatus to:
read, by the processor, content of a file-backed table in a database having a concurrency control mechanism; and modify, by the processor, the content of the file-backed table, wherein when modifying the content of the file-backed table, the instructions further configure the apparatus to:

write, by the processor, one or more new data files that contain modified content of the file-backed table; and update, by the processor, a metadata table that comprises metadata for the file-backed table, by using the concurrency control mechanism of the database;

wherein the instructions further configure the apparatus to modify content of the file-backed table by an operation selected from: an insertion of one or more records; a deletion of one or more records; an update one or more existing records, or any combination thereof.

2. The computing apparatus of claim 1, wherein:

when reading the content of the file-backed table, the instructions further configure the apparatus to:

scan, by the processor, a metadata table that contains metadata for the file-backed table;

determine, by the processor, one or more metadata records that are visible by using the concurrency control mechanism of the database; and return, by the processor, content of one or more data files that correspond to the one or more metadata records that are visible.

3. The computing apparatus of claim 1, wherein when the modified content is the insertion of one or more records, the instructions further configure the apparatus to:

write, by the processor, the one or more new data files that contain the one or more inserted records; and insert, by the processor, one or more new metadata records into the metadata table, the one or more new metadata records referencing the one or more new data files.

4. The computing apparatus of claim 1, wherein when the modified content is the deletion of one or more records, the instructions further configure the apparatus to:

locate, by the processor, one or more data files that contain the one or more records to be deleted;

make, by the processor, a new copy of each of the one or more data files, each new copy omitting the one or more records that are to be deleted;

locate, by the processor, one or more metadata records that correspond to the new copy of each of the one or more data files; and update, by the processor, a data file locator in each of the one or more metadata records to point to the new copy of each of the one or more data files; and where the new copy of each of the one or more data files is empty:

delete, by the processor, the one or more metadata records that correspond to the new copy of each of the one or more data files.

5. The computing apparatus of claim 1, wherein when the modified content is updating the one or more existing records, the instructions further configure the apparatus to:

locate, by the processor, one or more data files that contain the one or more existing records to be updated;

make, by the processor, a new copy of each of the one or more data files, each new copy including the one or more existing records to be updated;

locate, by the processor, one or more metadata records that correspond to the new copy of each of the one or more data files; and update, by the processor, a data file locator in each of the one or more metadata records to point to the new copy of each of the one or more data files.

6. A non-transitory computer-readable storage medium, the computer-readable storage medium including instructions that when executed by a computer, cause the computer to:

read, by a processor, content of a file-backed table in a database having a concurrency control mechanism; and modify, by the processor, the content of the file-backed table, wherein when modifying the content of the file-backed table, the instructions further cause the computer to:

write, by the processor, one or more new data files that contain modified content of the file-backed table; and update, by the processor, a metadata table that comprises metadata for the file-backed table, by using the concurrency control mechanism of the database;

wherein the instructions further cause the computer to modify content of the file-backed table by an operation selected from: an insertion of one or more records; a deletion of one or more records; an update one or more existing records, or any combination thereof.

7. The computer-readable storage medium of claim 6, wherein:

when reading the content of the file-backed table, the instructions further cause the computer to:

scan, by the processor, a metadata table that contains metadata for the file-backed table;

determine, by the processor, one or more metadata records that are visible by using the concurrency control mechanism of the database; and return, by the processor, content of one or more data files that correspond to the one or more metadata records that are visible.

8. The computer-readable storage medium of claim 6, wherein:

when the modified content is the insertion of one or more records, and the instructions further configure the computer to:

write, by the processor, the one or more new data files that contain the one or more inserted records; and insert, by the processor, one or more new metadata records into the metadata table, the one or more new metadata records referencing the one or more new data files.

9. The computer-readable storage medium of claim 6, wherein:

when the modified content is the deletion of one or more records, and the instructions further configure the computer to:

locate, by the processor, one or more data files that contain the one or more records to be deleted;

make, by the processor, a new copy of each of the one or more data files, each new copy omitting the one or more records that are to be deleted;

locate, by the processor, one or more metadata records that correspond to the new copy of each of the one or more data files; and update, by the processor, a data file locator in each of the one or more metadata records to point to the new copy of each of the one or more data files; and where the new copy of each of the one or more data files is empty:

delete, by the processor, the one or more metadata records that correspond to the new copy of each of the one or more data files.

10. The computer-readable storage medium of claim 6, wherein:

when the modified content is the updating the one or more existing records, and the instructions further configure the computer to:

locate, by the processor, one or more data files that contain the one or more existing records to be updated;

make, by the processor, a new copy of each of the one or more data files, each new copy including the one or more existing records to be updated;

locate, by the processor, one or more metadata records that correspond to the new copy of each of the one or more data files; and update, by the processor, a data file locator in each of the one or more metadata records to point to the new copy of each of the one or more data files.

11. A computer-implemented method for editing a file-backed table in a database having a concurrency control mechanism, the method comprising:

reading, by a processor, content of the file-backed table; and modifying, by the processor, the content of the file-backed table, wherein modifying the content of the file-backed table comprises:

writing, by the processor, one or more new data files that contain modified content of the file-backed table; and updating, by the processor, a metadata table that contains metadata for the file-backed table, by using the concurrency control mechanism of the database; and wherein the modifying the content of the file-backed table is an operation by the processor configured to execute: an insertion of one or more records; a deletion of one or more records; an update one or more existing records, or any combination thereof.

12. The computer-implemented method of claim 11, wherein:

reading the content of the file-backed table comprises:

scanning, by the processor, a metadata table that contains metadata for the file-backed table;

determining, by the processor, one or more metadata records that are visible by using the concurrency control mechanism of the database; and returning, by the processor, content of one or more data files that correspond to the one or more metadata records that are visible.

13. The computer-implemented method of claim 11, wherein when the modified content is the insertion of one or more records, the method further comprising:

writing, by the processor, the one or more new data files that contain the one or more inserted records; and inserting, by the processor, one or more new metadata records into the metadata table, the one or more new metadata records referencing the one or more new data files.

14. The computer-implemented method of claim 11, wherein when the modified content is the deletion of one or more records, the method further comprising:

locating, by the processor, one or more data files that contain the one or more records to be deleted;

making, by the processor, a new copy of each of the one or more data files, each new copy omitting the one or more records that are to be deleted;

locating, by the processor, one or more metadata records that correspond to the new copy of each of the one or more data files; and updating, by the processor, a data file locator in each of the one or more metadata records to point to the new copy of each of the one or more data files; and where the new copy of each of the one or more data files is empty:

deleting, by the processor, the one or more metadata records that correspond to the new copy of each of the one or more data files.

15. The computer-implemented method of claim 11, wherein when the modified content is the updating the one or more existing records, the method further comprising:

locating, by the processor, one or more data files that contain the one or more existing records to be updated;

making, by the processor, a new copy of each of the one or more data files, each new copy including the one or more existing records to be updated;

locating, by the processor, one or more metadata records that correspond to the new copy of each of the one or more data files; and updating, by the processor, a data file locator in each of the one or more metadata records to point to the new copy of each of the one or more data files.

* * * * *